(No Model.) 2 Sheets—Sheet 1.
G. F. DEACON.
APPARATUS FOR RECORDING THE FLOW OF WATER.
No. 428,804. Patented May 27, 1890.
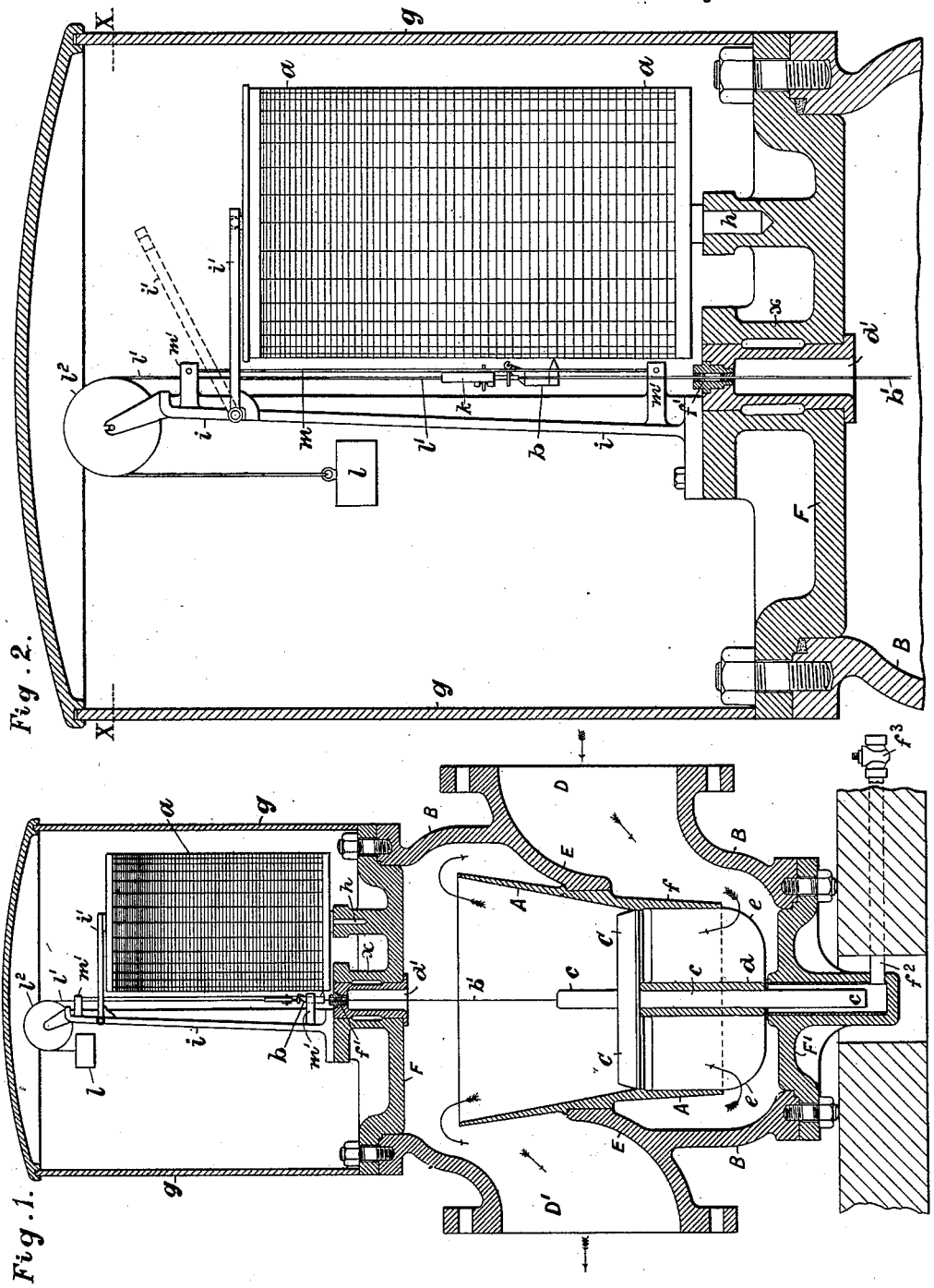
WITNESSES
Robert Bartlett
R. A. Corinaldi
INVENTOR
George Frederick Deacon
by Bradnar & Bull
Attys

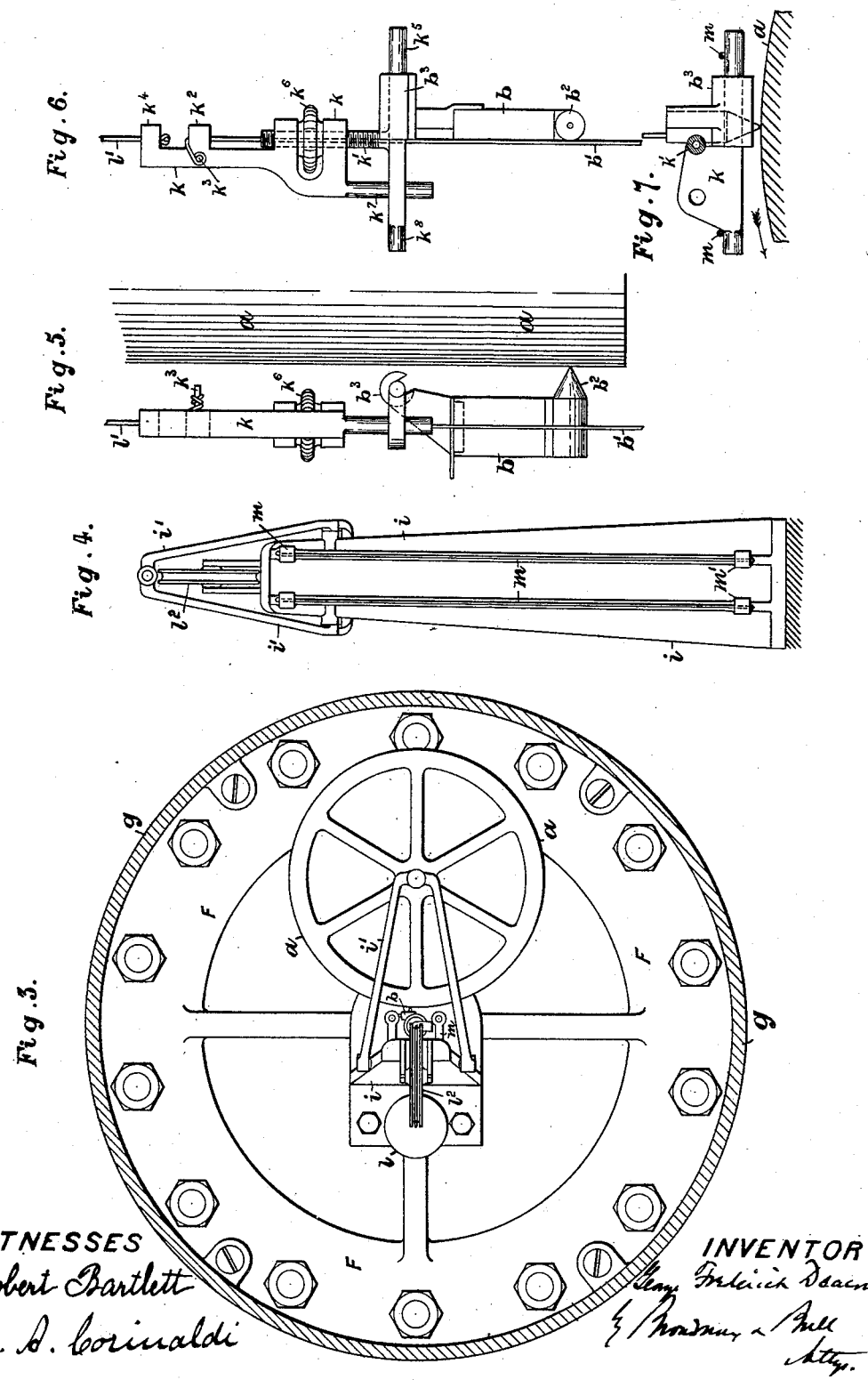

UNITED STATES PATENT OFFICE.

GEORGE FREDERICK DEACON, OF LIVERPOOL, COUNTY OF LANCASTER, ENGLAND.

APPARATUS FOR RECORDING THE FLOW OF WATER.

SPECIFICATION forming part of Letters Patent No. 428,804, dated May 27, 1890.

Application filed November 25, 1887. Serial No. 256,041. (No model.)

*To all whom it may concern:*

Be it known that I, GEORGE FREDERICK DEACON, civil engineer, a subject of the Queen of Great Britain, residing at Liverpool, in the county of Lancaster, in that part of the United Kingdom of Great Britain and Ireland called England, have invented certain new and useful Improvements in Apparatus for Measuring the Flow of Water or other Liquids in Pipes, of which the following is a specification.

This invention relates to apparatus for measuring the flow of water or other liquids in pipes in which a disk, ball, or other object or body is placed in a truncated hollow cone or tapered water-way, such water-way being so connected with, say, a water-main, that the water passing through that main will flow through such tapered water-way from the smaller toward the larger end, the disk or other object filling or partly filling the smaller end of the water-way and being capable of moving in the direction of the axis of the cone toward the larger part thereof, so as to leave an annular water-way, increasing in sectional area as the disk recedes from the position in which it fills or partly fills the tapered water-way.

My present invention also relates to certain improvements on previous patents, for which I have obtained Letters Patent for the United States, dated September 21, 1875, No. 167,994, entitled "Apparatus for indicating and recording the velocity of water in pipes," and September 23, 1884, No. 305,433, entitled "Apparatus for indicating the velocity or measuring the flow of water in pipes."

My invention consists of the combination of certain mechanical devices arranged to coact with reference to each other to produce the result hereinafter fully specified, the points of novelty being designated in the claims concluding this specification.

In apparatus for measuring the flow of water and other liquids in pipes in which it has been proposed to employ a disk or body within a tapered water-way, the said water-way having its larger end uppermost, the recording mechanism has been of the integrating type.

Now, this present invention relates to that type of fluid-measuring apparatus termed "differentiating-meters," and sometimes called "disk-gages," in contradistinction to "integrating-meters," and which are to be employed chiefly for the purpose of measuring and recording graphically the nature as well as the volume of flow in mains used for the supply of water to towns or districts or to various sections of a town or district. By my present invention I arrange the differentiating and recording mechanism above the inverted cone and disk and so construct the disk that it constitutes the weight or a considerable portion of the weight necessary to give the required resistance to the flow of fluid past it, thereby reducing the amount of stress put upon the wire actuating the pen or pencil, and thus reducing its necessary thickness and consequent friction at the stuffing-box, as well as the load and friction upon the axle of the pulley, and rendering the apparatus more suitable for the work it has to perform, particularly for meters of large size—such as those having cones of twelve, eighteen, and twenty-four inches internal diameter, or still larger meters.

That this invention may be clearly understood, it will now be described clearly and exactly. For this purpose there are annexed to this specification two sheets of drawings illustrating my invention, which, together with the description herein contained, will be sufficient to enable others skilled in the art to which it belongs to make the same.

The drawings are marked with figures and letters of reference corresponding with those used in the following explanation.

Like letters are used to denote like parts throughout the views.

In the drawings, Figure 1 is a sectional elevation of a differentiating meter constructed according to this invention in its preferred form. Fig. 2 is a detail of upper gear of same. Fig. 3 is a plan through the gear shown in Fig. 2 at the line $x\,x$. Fig. 4 is a front inside view of pen and weight standard. Figs. 5, 6, and 7 are respectively side elevation, front view, and plan of pen and pen-carrier.

According to the present invention for measuring the flow of fluids in pipes, the tapered water-way A is placed in the body of the apparatus with its larger end uppermost. The disk C, when in its zero position, is at the smaller end of the cone A, and fills, or partly fills, that end. The disk C constitutes a weight or is weighted, and when water flows it is pushed up by the pressure upon it due to the velocity of the water, and the annular space between the cone and the disk increases as the disk is moved upward. The inlet D and outlet D' of the body B and their sockets or flanges are arranged opposite one another, and the tapered water-way A is secured to an annular diagonal diaphragm E.

The body B is provided with upper and lower covers F and F', the upper opening of the body being of such size as to permit of the cone A being passed through and secured to its seat. A pipe $f^2$ and a cock or valve $f^3$ are provided in the cover F', through which by opening the cock $f^3$ the bottom of the apparatus may be scoured of any earthy deposits that may take place. The cock-drum $a$, pen or pencil $b$, and the other parts of the differentiating mechanism or gear are secured to and arranged above the cover F.

The disk C is provided with a guiding-stem $c$, projecting above and below it. The lower guide, in which the lower stem works, is formed by a tube $d$, formed on vanes $e$, cast to the cylindrical portion $f$ of the tapered water-way A. The upper stem of the disk works in a guide-bearing $d'$, formed in the top cover F when the disk is high up in the tapered water-way. The clock-drum $a$ and standard $i$ are inclosed by the case $g$.

The clock is arranged within the drum $a$ as in my former patent, No. 305,433, 1884, and causes the drum, with its diagram of paper or other material, to revolve. The upper center of the spindle of the drum $a$ works in a bearing $i'$, which is secured to the standard $i$, and can be thrown up, as in Figs. 2 and 4, so as to admit of the drum $a$ being readily removed. The vanes $e$ beyond, serving to support the guide $d$, prevent vortex motion of the fluid in passing through the meter, and thereby obviate inaccuracies of measurement due to such cause.

The marking-pen $b$ and the disk C are connected together by the wire $b'$. The upper connection of this wire is made to the pen-carrier $k$ by passing it through the hollow stem $k'$ of the pen-carrier through the boss $k^2$ and securing it to the pin $k^3$. The lower end of the wire is connected to the end of the disk-stem $c$ in any convenient way.

The pen-carrier stem $k'$ is placed and works in the line of the axis of the disk-stem $c$.

To put the requisite amount of tension upon the wire $b'$, a small counterbalance-weight $l$ is suspended by a cord $l'$, which passes over the pulley $l^2$ and is attached to the boss $k^4$ of the pen-carrier $k$. The disk-wire $b'$ passes through the gland $f'$.

To cause the point $b^2$ of the pen $b$ to press upon the diagram on the drum $a$, its support is situated in a vertical plane somewhat nearer to the drum than the center of gravity of the pen. This support consists of a bar $k^5$, upon which the hook $b^3$ of the pen hangs. The pen $b$ is adjusted relatively to the disk C by means of the screwed rod $k'$ and nut $k^6$. By turning this nut in either one direction or the other the pen is either raised or lowered. To prevent the two portions of the pen-carrier from turning when adjusting the pen or at any other time, the upper part of the carrier is provided with a pin $k^7$, which passes through a hole in the plate of the lower portion of the carrier.

The pen $b$ is filled with marking-fluid, and is constructed and works substantially as ordinary siphon-pens of this type. The pen is guided vertically by wires $m$. (See Figs. 2, 4, and 7.) It will be seen that the bars $k^5$ and $k^8$ of the pen-carrier $k$ come just in front of the wires $m$, and so the pen is prevented from turning, whatever the position of it may be vertically. The lateral guide to the pen is afforded by the disk-wire $b'$, against which the side of the pen $b$ bears, the direction of the drum $a$ being from right to left, as shown by the arrow in Fig. 7. The wires $m$ are fixed to bosses $m'$, formed on the standard $i$. When the free surface of the water is not much above the top of the meter-body, I elongate the neck $x$, so as to project above the free surface of the water, and thus remove the necessity for a stuffing-box.

By the above construction of apparatus a simple and compact form of meter occupying small space is provided. The clocks of the meters, particularly of large ones—such as twelve or eighteen inches, or still larger meters—may be constructed to go for a period of eight days or a month.

By use of the terms "differentiating-meter" and "differentiating mechanism," employed in the specification, I distinguish between the meter described, which records not only the amount of water which has passed through the device, but also the difference or state of flow of the water at any given time, and an integrating-meter which only records the total amount of water which has passed through the device.

Having now particularly described and ascertained the nature of this invention and in what manner the same is to be performed, what I claim is—

1. In an apparatus for measuring the flow of liquids in pipes, a tapered water-way arranged with its larger portion uppermost, and through which the liquid flows from the smaller to the larger portion, and a disk impelled in one direction by gravity and in the opposite direction by the water flowing through said water-way, in combination with a differentiating recording mechanism, by means of which the movements of said disk are recorded, substantially as described.

2. In an apparatus for measuring the flow of liquids in pipes, an inclosing-case provided with inlet and outlet orifices, a tapered water-way contained in said case, arranged with its larger portion uppermost, and through which the water flows from the smaller to the larger portion, and a disk impelled in one direction by gravity and in the opposite direction by the water flowing through said water-way, in combination with a differentiating recording mechanism, by means of which the movements of said disk are recorded, substantially as described.

3. In an apparatus for measuring the flow of liquids in pipes, an inclosing-case having inlet and outlet orifices at substantially the same level, a tapered water-way arranged with its larger portion uppermost, and through which the liquid flows from the smaller to the larger portion, and a disk impelled in one direction by gravity and in the opposite direction by the water flowing through said water-way, in combination with a differentiating recording mechanism, by means of which the movements of said disk are recorded, substantially as described.

4. In an apparatus for measuring the flow of liquids in pipes, a tapered water-way arranged with its larger portion uppermost, and through which the liquid flows from the smaller to the larger portion, and a disk impelled in one direction by gravity and in the opposite direction by the water flowing through said water-way, combined with a guide adapted to coact with the stem of the disk, vanes arranged at the inlet end of said water-way, to which said guide is attached, substantially as described.

5. In an apparatus for measuring the flow of liquids in pipes, the combination of a tapered water-way arranged with its larger portion uppermost, and through which the liquid flows from the smaller to the larger portion, and a disk impelled in one direction by gravity and in the opposite direction by the water flowing through said water-way, combined with a differentiating recording mechanism consisting of a marking device, a rod connecting said marking device and said disk, and a counterbalance-weight substantially equal to the weight of said connecting-rod and marking device, substantially as described.

6. In an apparatus for measuring the flow of liquids in pipes, the combination, with a tapered water-way, of vanes arranged on the inlet end of said water-way to prevent vortex motion of the water passing through said way, and a disk contained within, and having a longitudinal movement with relation to said water-way, whereby the annular water-passage between said elements is enlarged and contracted, substantially as described.

7. In an apparatus for measuring the flow of liquids in pipes, a tapered water-way arranged with its larger portion uppermost, and through which the liquid flows from the smaller to the larger portion, and a disk impelled in one direction by gravity and in the opposite direction by the water flowing through said water-way, said disk being of a weight sufficient or substantially sufficient to balance the pressure of the flowing water, combined with a differentiating recording mechanism consisting of a connecting-rod passing through a stuffing-box, dividing the chamber containing the recording mechanism from that through which the water is flowing, and a counterbalance-weight substantially equal to the weight of said connecting-rod and marking device, whereby friction is diminished, substantially as described.

8. In an apparatus for measuring the flow of liquids in pipes, a tapered water-way arranged with its larger end uppermost, through which the liquid flows from the smaller to the larger portion, and a disk impelled in one direction by gravity and in the opposite direction by the water flowing through said water-way, combined with a weight operating in the direction of said flowing water and a differential recording mechanism, substantially as described.

GEORGE FREDERICK DEACON.

Witnesses:
ERNEST R. ROYSTON,
JAMES ANDREW COUBROUGH.